US010452523B1

(12) United States Patent
Vijayalekshmi

(10) Patent No.: US 10,452,523 B1
(45) Date of Patent: Oct. 22, 2019

(54) SYSTEM AND METHOD FOR STATE BASED INTELLIGENT TEST GENERATION

(71) Applicant: Intuit Inc., Mountain View, CA (US)

(72) Inventor: Deepesh Ramachandran Vijayalekshmi, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 47 days.

(21) Appl. No.: 15/837,210

(22) Filed: Dec. 11, 2017

(51) Int. Cl.
*G06F 9/44* (2018.01)
*G06F 11/36* (2006.01)
*G06N 20/00* (2019.01)

(52) U.S. Cl.
CPC ...... *G06F 11/3684* (2013.01); *G06F 11/3664* (2013.01); *G06F 11/3688* (2013.01); *G06N 20/00* (2019.01)

(58) Field of Classification Search
CPC . G06F 8/443; G06F 8/433; G06F 8/30; G06F 8/427; G06F 8/441
USPC .......................................... 717/117, 121, 144
See application file for complete search history.

(56) References Cited

U.S. PATENT DOCUMENTS

2017/0270245 A1* 9/2017 van Rooyen .......... G16B 50/00

\* cited by examiner

*Primary Examiner* — Chuck O Kendall
(74) *Attorney, Agent, or Firm* — Hawley Troxell Ennis & Hawley LLP; Philip McKay

(57) ABSTRACT

A system and method for use with a data management service that provides a finite state machine with machine learning based generation of tests to ensure exhaustive coverage of the compound states of an application undergoing modification. The finite state machine is modified with inputs of feedback from production usage of the application. A continuous virtual test pool utilizes the finite state machine to replicate numerous instances of users simulating the possible states of the application.

59 Claims, 7 Drawing Sheets

SYSTEM AND METHOD FOR STATE BASED INTELLIGENT TEST GENERATION

BACKGROUND

Software application providers, including providers of software services and data management services, typically develop applications to collect and manage data from users. It is desirable to test such applications before being released to the users, and to fix any application defects that, for example, cause incorrect or unintended results. Software testing is traditionally the process of executing an application with the intent of finding errors. An application can be tested manually, in which a tester interacts with an application to perform steps of a test case and the tester monitors the results for defects. However, manual testing of an application is generally time consuming and may not cover all test cases or execution paths through an application. Thus, to improve the coverage of testing on an application prior to release, test automation, in which a test script of instructions is created from a test case, may be used. The test scripts are executed repeatedly by testing tools and comparisons are made between actual outcomes and predicted outcomes. Test automation is considered advantageous in traditional data management environments because the test scripts, after being created, can be repetitively executed.

However, in current software application development environments, it is also considered to be burdensome to create test scripts. Not only is it time consuming to create test cases, from which test scripts are derived, but it is also onerous to maintain test scripts after the test scripts are created. For example, when testing an application under development, the ability to quickly react to ever-changing application functionality and requirements is critical. Accordingly, although the benefits of test automation are well known, automated testing in current data management systems is often unutilized and neglected due to the time and costs of test script creation and maintenance.

Furthermore, with the advancement in the complexity of applications, test script creation has become even more difficult in current data management environments. Traditional testing of complex applications to achieve software quality is known to be labor intensive, time consuming, and limited in thoroughness. For example, it is thought that for complex applications, software testing traditionally consumes half of a project's resources in terms of both cost and time. The larger an application, the more complexity there is in terms of both static elements and dynamic elements. Software testing can be considered a tradeoff between budget, time, and quality, and it is considered cost prohibitive to increase test team size to match the growth rate of the complexity of applications. Yet, application defects can be buried within software code and can remain hidden until activated by users. Such activation by users may occur due to real world timing, unpredictable infrastructure effects, and random human interactions with unpredictable input parameters to the applications. Further complications result from the dynamic nature of applications that undergo changes during the software lifecycle, which often invalidates prior test cases and test scripts.

Applications are designed, built, and deployed by teams of fallible engineers, giving applications a fragile characteristic. Yet, due to the fallibility of such teams comprehending the complexity of applications, detecting all or most of the different software failure modes for an application is generally considered infeasible. For example, an application with minimal complexity of just one hundred lines of code may have up to $10^{14}$ possible paths that can be executed. Even the most highly skilled tester cannot come up with all such possibilities for testing. Nevertheless, with the ubiquitous nature of complex applications, business and societal costs of big software failures can be astronomical. For example, a failure of a complex application can have such a severe impact on users that the failure can lead to real-life disasters, financial impacts, and so on.

Consequently, what is needed is a system and method that solves the long standing technical problem in the data management arts of state based intelligent test generation that evaluates attributes and capabilities of an application to determine that it meets the desired results through quality assurance, verification, and validation.

SUMMARY

Embodiments of the present disclosure provide technical solutions that address some of the shortcomings associated with traditional application development and data management service provider systems by providing systems and methods of state based intelligent test generation. Embodiments of the present disclosure accomplish this through a test engine system that creates a finite state machine that analogizes an application. In one embodiment, the finite state machine is generated from state model data that represents an abstraction of states of an application and action configuration data that represents an abstraction of actions of the application that lead from one application state to another. In one embodiment, the state model data is generated from a data generator module that generates a plurality of variables of the application.

In one embodiment, the finite state machine is stored as graph data within a graph database. In one embodiment, the graph data is traversed by a state traverser module. In one embodiment, the state traverser module is guided in its traversal by next action prediction data from a machine learning engine module. In one embodiment, the state traversal module is also guided in its traversal by predicted pattern data stored by a model traversal configuration module and derived from the machine learning engine module. In one embodiment, the machine learning engine module ensures exhaustive coverage of compound states of an application by utilizing action feedback data that represents a pattern of usage by users of the application. In one embodiment, the traversal history of the traversals performed by the state traversal module is stored as traversal history data by a model traversal metric module. In one embodiment, the state traverser module generates test case data that represents an abstracted action associated with a state of the application.

In one embodiment, utilizing the test case data, a test execution adapter module interfaces with projects of an application. In one embodiment, a project of an application includes shared libraries that are undergoing development or are being modified. In one embodiment, a project of an application represents a feature change to an application, and the feature change includes modification of a discrete portion of an application that is related to the feature. In one embodiment, the test execution adapter module matches the test case data to an applicable project. In one embodiment, such matching is based on validation expectation data generated by the machine learning engine module. In one embodiment, the test case data is executed by a project through an endpoint of the project, leading to a determination of a result of a project test.

Embodiments of the present disclosure include a test pool system that interacts with the finite state machine of the test engine system. In one embodiment, a virtual user profile database stores virtual user profile data that is utilized by a test lab interface module. In one embodiment, the test lab interface module allows a tester to select data from the virtual user profile database and store the selection data to an active pool module as virtual user profiles of active pool data. In one embodiment, a virtual pool instance manager module utilizes the active pool data to launch a traversal of the graph data by the state traverser module. In one embodiment, the traversal is aided by administration data from a test data manager module enabling application authentication through the endpoint of the application project. In one embodiment, a tester may initiate testing via a virtual test pool dashboard module, and the tester receives displayed test results via the virtual test pool dashboard module.

Figure 1:
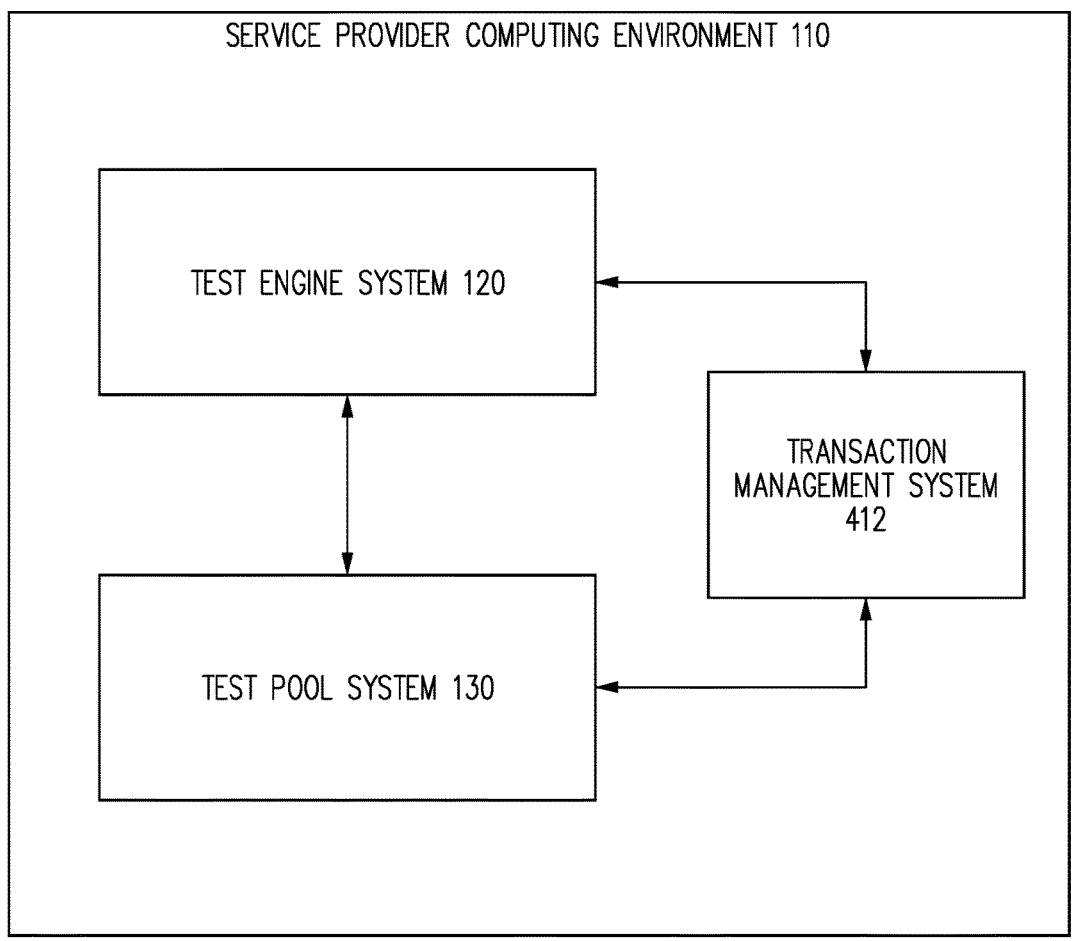
FIG. 1 is a functional block diagram of a production environment for state based intelligent test generation, in accordance with various embodiments.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system, computing device, and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application. In various embodiments, one or more cloud computing environments are used to create, and/or deploy, and/or operate an application that can be any form of cloud computing environment, such as, but not limited to, a public cloud; a private cloud; a Virtual Private Cloud (VPC); or any other cloud-based infrastructure, sub-structure, or architecture, as discussed herein, and/or as known in the art at the time of filing, and/or as developed after the time of filing. In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing. In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, communication channel, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the terms "user," "tester," "domain expert," and "customer" include, but are not limited to, any party, parties, entity, or entities using, or otherwise interacting with any of the methods or systems discussed herein. For instance, in various embodiments, a user can be, but is not limited to, a person, a commercial entity, an application, a service, or a computing system. In various embodiments, a domain expert is a tester having knowledge or expertise of a domain or module of an application.

As used herein, the term "relationship" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "data store," "data storage device," and "data warehouse" include, but are not limited to, any physical or virtual data source or storage device. For instance, in various embodiments, a data store or storage container can be, but is not limited to, one or more of a hard disk drive, a solid-state drive, an EEPROM, an optical disk, a server, a memory array, a database, a virtual database, a virtual memory, a virtual data directory, a non-transitory computer-readable medium, or other physical or virtual data sources.

As used herein, the terms "artificial intelligence," "machine learning," and "machine learning algorithms" include, but are not limited to, machine learning algorithms for predictive model training operations such as one or more of artificial intelligence operations, regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

As used herein, the term "system" includes, but is not limited to, the following: computing system implemented, and/or online, and/or web-based, personal and/or business transaction aggregation and/or processing systems, services, packages, programs, modules, or applications; computing system implemented, and/or online, and/or web-based, personal and/or business data management systems, services, packages, programs, modules, or applications; computing system implemented, and/or various other personal and/or business electronic data management systems, services, packages, programs, modules, or applications, whether known at the time of filing, or as developed later.

As used herein, the term "transaction management system" includes, but is not limited to, the following: computing system implemented, and/or online, and/or web-based, personal and/or business transaction management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

As used herein, a transaction management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

Specific examples of transaction management systems include, but are not limited to the following: QuickBooks™, available from Intuit, Inc. of Mountain View, Calif.; QuickBooks On-Line™, available from Intuit, Inc. of Mountain View, Calif.; QuickBooks Self-Employed available from Intuit, Inc. of Mountain View, Calif.; Mint On-Line™, available from Intuit, Inc. of Mountain View, Calif.; Mint On-Line™, available from Intuit, Inc. of Mountain View, Calif.; TurboTax™, available from Intuit, Inc. of Mountain View, Calif., and/or various other transaction management systems discussed herein, and/or known to those of skill in the art at the time of filing, and/or as developed after the time of filing.

Embodiments of the present disclosure provide a system and method for use with a data management service that provides a finite state machine with machine learning based generation of tests to ensure exhaustive coverage of the compound states of an application undergoing modification. The finite state machine is modified with inputs of feedback from production usage of the application. A continuous virtual test pool utilizes the finite state machine to replicate numerous instances of users simulating the possible states of the application.

The disclosed embodiments provide one or more technical solutions to the technical problem of generating a state based intelligent test. These and other embodiments of a data management system are discussed in further detail below.

Overview

Embodiments of the present disclosure provide a system and method for use with a data management service for state based intelligent test generation. The present disclosure allows an example tester, such as an engineer, a developer, and the like, to test changes to a module that the tester is implementing for an application. It is to be understood that the scenario of an example tester is for comprehension purposes of some embodiments, and is not to be considered limiting. In one embodiment, a team of engineers may be working on changes to a feature of an application under a scrum sprint within an agile development framework. The example tester may be a new member of the engineering team and so is lacking history and domain knowledge about the feature. For example, if the application is a financial management system, a domain may be invoices, purchase orders, payroll, and the like.

The example tester may have knowledge about the changes to the feature in order to conduct software development, but does not have knowledge about the wider implications of the changes outside of the feature, such as in the rest of the application. Under this scenario, the human brain of the example tester cannot think of the possible complex combinations and permutations of data and states that an application can go through. In one embodiment, a change to a feature may have an unintended ripple effect on the rest of the application. While such a ripple effect may be of little consequence, it may also grow into a tsunami. The example tester may speak to the other engineering team members for guidance regarding potential impacts of the feature changes to the application's ecosystem, but due to the complexity of most applications, the example tester may feel overwhelmed with how to test the changes that the example tester is developing.

Embodiments of the present disclosure enable the example tester to conduct testing that takes into account the complex ecosystem of the application. In one embodiment, the example tester utilizes a state model module to examine the business rules that are currently in existence for the feature being modified. For example, developers often code business rules into software, and it is beneficial to gain an understanding of those business rules. In one embodiment, an application is considered a subset of its state that can be tested. Having gained an understanding of the business rules of the application from the state model module, the example tester may be able to define what modifications the software changes would make to the state model and can make changes to the state model, such as through software test code changes.

The example tester may understand not only what the changes are, but may also understand the impact of those changes. The example tester may then regenerate the state model, which may cause a finite state machine to include thousands of new possible states and paths that the example tester's changes have introduced into the application. Such new possible states and paths may now be included for test generation and execution. Such may be advantageous because all the possible actions may be documented within the software test code which can be read by the test engine system, and the possible variations can be defined through variables. Accordingly, the combinations of the actions may be executed for any change made by the example tester. In one embodiment, even if the example tester does not do any explicit testing, the test engine system can ensure that the expectations of a hypothetical domain expert is met by executing all the combinations of what is documented as actions with the software test code of the application.

Embodiments of the disclosure enable the example tester to utilize a virtual test pool via a test pool system. The test pool system provides for allowing the example tester to configure the test engine system to execute a full coverage test, such as by selecting applicable user profiles and executing project testing based on the selected user profiles. The full test coverage is accomplished by the newly generated state model. The example tester can monitor the status of the testing via a virtual test pool dashboard module. The status may include the progress of tests, test failure notifications, application exceptions, related stack traces, and the like. Thus, under this scenario, the example tester can execute a fully integrated automated test integration with an application quickly, such as in just a few hours, and quickly receive test results. This enables the example tester to increase the velocity of software development in order to deliver improved software to users in a faster timeframe.

Hardware Architecture

FIG. 1 is a functional block diagram of a production environment 100 for state based intelligent test generation, in accordance with various embodiments. The production environment 100 includes a service provider computing environment 110, according to various embodiments. The service provider computing environment 110 represents one or more computing systems such as one or more servers and/or distribution centers that are configured to receive, execute, and host one or more data management systems (e.g., applications) for access by one or more clients, for state based intelligent test generation, according to one embodiment. The service provider computing environment 110 represents a traditional data center computing environment, a virtual asset computing environment (e.g., a cloud computing environment), or a hybrid between a traditional data center computing environment and a virtual asset computing environment, according to various embodiments.

In some embodiments, the service provider computing environment 110 includes a test engine system 120. In some embodiments, the service provider computing environment 110 includes a test pool system 130. In some embodiments, the service provider computing environment 110 includes both the test engine system 120 and the test pool system 130. In some embodiments, the service provider computing environment 110 includes a transaction management system 412. In one embodiment, the transaction management system 412 is an application that is undergoing development, whether as new software or modified software. In one embodiment, an application is tested as it is being developed through new software code. In one embodiment, an application can be tested when it undergoes modifications through software code changes. In one embodiment, the application comprises a set of actions, and each action can have a set of validations.

In one embodiment, an application is validated by generating a number of actions, such as N number of actions that can be validated by the test engine system 120. In some embodiments, an N number of actions may be millions of combinations of actions, and the test engine system 120 ensures that the actions result in a particular expected state. In one embodiment, the test engine system 120 has valid test data to perform validations of the actions. In one embodiment, truth tables are utilized by the test engine system 120 to perform data validations and to assess expected states of an application. For example, if an action is executed, the application will move to a different state, and that state will be validated by the test engine system 120.

In some embodiments, the test pool system 130 includes a virtual test pool that interacts with the test engine system 120 to perform validation of an application. In some embodiments, the test pool system 130 enables a tester to validate that changes to an application cause expected results via the test engine system 120. In some embodiments, the test engine system 120 includes a finite state machine and a learning based generation of tests to provide an exhaustive coverage of the compound states that an application can go through. Such compound states may include validating a plurality of modules of an application, even if just one module was modified. In one embodiment, the test engine system 120 validates the whole application, rather than a single module in isolation from the rest of the application.

In some embodiments, the test engine system 120 receives inputs on feedback data from production usage of the application. Such inputs may be beneficial to improve the action flows between states that the test engine system 120 covers. In some embodiments, the test pool system 130 interacts with the test engine system 120 to replicate numerous instances of users of an application. In some embodiments, replicating numerous instances of users may be accomplished with virtual user profiles that enable the simulation of the possible states of the application.

In one embodiment, the test engine system 120 uses the power of computing to identify tests of an application through all possible compounded states of the application. In one embodiment, the test pool system 130 provides testers with the ability to test changes to an application such that, for example, the changes can be verified. In one embodiment, the test engine system 120 provides a system wide test that an application is executing within its expected state regardless of a tester's narrow focus within an application. The test pool system 130 in combination with the test engine system 120 can be thought of as pool of super brilliant testers who are not only able to test all relevant states of an application, but are also ready to get to work testing anytime.

Traditionally, state based testing methodologies and model based testing methodologies have been ineffective for testing applications of significant complexity. For example, traditionally, the enormity of the user data that can be applied to states of an application causes a massive state explosion problem that makes models unmanageable, and effectively incomprehensible. For further example, creating and maintaining even a single state instance for a complex application can become overwhelming, which in turn can cause state model maintenance issues and unintended consequences on its usage. Such state model maintenance issues have traditionally eluded effective and efficient solutions, because the cost of human resources to maintain a sufficiently sized team of testers would become economically infeasible. Such may traditionally be due to numerous modules of an application making variable changes, such as from X=1 to X=2, which changes the entire state of the application. When a plurality of variables is changing continuously through many simultaneous actions within an application, a complex application traditionally becomes untestable with such state explosion. However, the embodiments of the disclosure limit such state explosion by limiting the states of the application.

Figure 2:
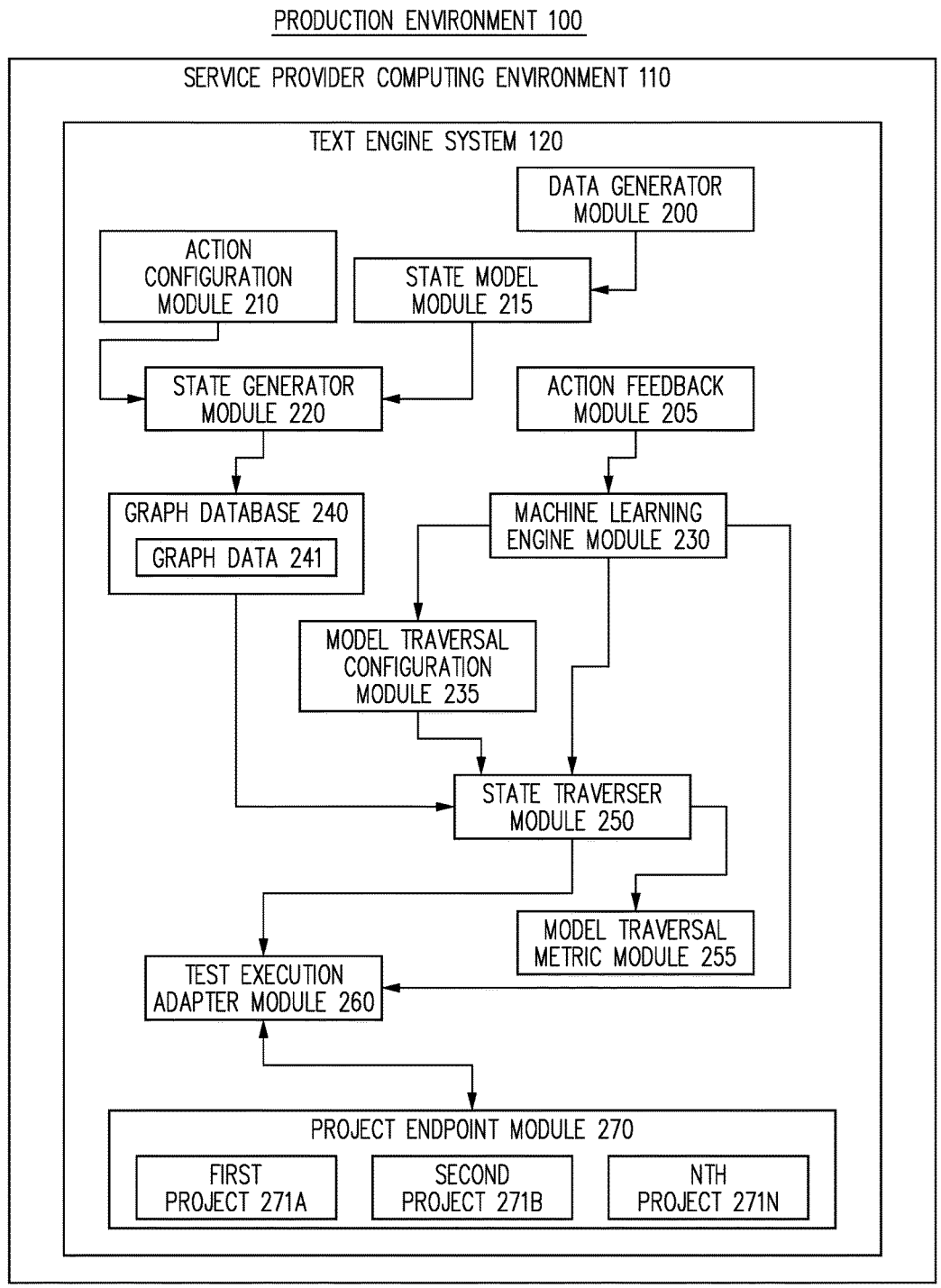
FIG. 2 is a functional block diagram of a production environment for state based intelligent test generation, in accordance with various embodiments.

FIG. 2 is a functional block diagram of a production environment 100 for state based intelligent test generation, in accordance with various embodiments. Referring to FIGS. 1 and 2 together, the service provider computing environment 110 includes a test engine system 120. In contrast, in one embodiment, the test engine system 120 limits state explosion problems by limiting the states through utilizing action configuration data and state model data, which may include settings data, for state generation. Furthermore, in one embodiment, a layer of the test engine system 120 is added for user data generation and injection. In addition, using embodiments discussed herein, levels of abstraction in the state in an object oriented and hierarchical approach makes the state model relatively easy to manage.

In one embodiment, the test engine system 120 includes a state generator module 220. Traditionally, the generation of states resulted in unmanageable testing because the state generation traditionally had an effectively infinite number of action combinations and data combinations. In one embodiment, the test engine system 120 includes an action configuration module 210 and a state model module 215. In one embodiment, the action configuration module 210 and the state model module 215 enables the application of filters over the infinite number of combinations of actions and data to limit the potentially infinite combinations of actions and data to a manageable number of combinations. Such filters may be applied, for example, by domain experts.

For example, if an application is a financial management system, and the applicable domain of the financial management system is invoice, then a domain expert can define that there are not expected to be more than 10,000 invoices created for each company. Thus, under this example, the value of 10,000 is being overlaid onto the state generator module 220 as a filter to limit an infinite amount of combinations of actions and data. In this example, the lower limit would be zero (as a negative number of invoices cannot be created) and the upper limit would be 10,000 for the number of created invoices per company. Such a lower limit and upper limit effectively puts a finite limit on the number of invoices. It is to be understood that domain experts utilize the action configuration module 210 and the state model module 215 to create limitations of ranges of other variables of a domain using any range of values.

Furthermore, in some embodiments, domain experts create segmentation of a defined range. For example, if a domain expert understands that a range is from zero to 10,000, then the domain expert can further limit the values by defining, for example, increments of numbers within the range. Such an increment could, for this example, be five hundreds, thousands, and the like. The definitions of limitations can be considered abstracted filters that can limit states and prevent the finite state machine from reaching infinity in an abstraction layer. In one embodiment, an abstracted filter yields a range that causes the finite state to be finite. Under this embodiment, even though the finite state machine may be relatively large, it is still manageable because the states are limited to a finite scope. In one embodiment, the test engine system 120 includes a data generator module 200. The data generator module 200 generates data that can be filtered by the state model module 215.

In one embodiment, the action configuration module 210 stores an abstraction of each relevant module of an application. Such an abstraction enables each independent module of the application to be independent from the others. Such abstraction can be considered to overlap and change the common state of the application, such that independent modules of an application can be transformed. Such independence of application modules limits the explosive growth of states. For example, by segregating the application modules of a domain, and separately creating action configurations for the application modules via the action configuration module 210, the scope of the action configurations is limited to an understandable scope. For example, if a domain is invoice, there may be a limit of twenty scenarios for the invoice domain that is separate from the rest of the application. Such allows a domain expert to define what is relevant for a particular project or domain, and the definition can be independent from the rest of the application.

In one embodiment, the action configuration module 210 generates use cases of each module of an application, and the state model module 215 limits the ranges of the data to a manageable number of ranges. In one embodiment, the levels of abstraction in the application states via the action configuration module 210 and the state model module 215 enable an object oriented and hierarchical manner of enabling a state model to be manageable by domain experts.

In one embodiment, the test engine system 120 includes a state generator module 220. In one embodiment, the state generator module 220 enables the creation, generation, and traversal of states. In one embodiment, the state generator module 220 creates a state model of an application. In one embodiment, a state model is represented by a state graph, which may comprise graph data 241 stored in a graph database 240. In one embodiment, the graph database 240 is a Neo4j system available from Neo4j, Inc. of San Mateo, Calif. In one embodiment, the state graph is generated by the state generator module 220 based on the action configuration data determined by the action configuration module 210. In one embodiment, the state graph is also generated by the state generator module 220 based on the state model data determined by the state model module 215.

In one embodiment, the states of an application are represented as a graph (not shown). For example, a state may start from a "not logged in" state, which represents that a user is not logged into an application. Such a state can be considered a node of a graph. Another state may be a "logged in" state that is connected to the "not logged in" state with an edge that represents an action, such as "log in." A "logged in" state may represent that a user is logged into an application with proper authentication of the user's credentials. From a "logged in" state of the graph, there may be any number of nodes connected to the "logged in" node through applicable edges. For example, with a domain of invoices in a financial management system, a node might be "create invoice" state, "check chart of accounts" state, "pay employee" state, and the like. It is to be understood that any number of nodes of a graph may be connected to any number of other nodes via edges, where the nodes may represent states and the edges may represent actions (e.g., to transition between different states in the graph).

In one embodiment, the state generator module 220 represents a state as having a layer of data, such as a certain number of variables. For example, a variable may be an integer, a Boolean value, and the like. In one embodiment, the state generator module 220 represents a state as having a layer of actions, such as for each domain or module of an application. For example, a domain of invoice may have a list of actions associated with it in the action configuration module 210. Each action may have a method, and the method can be executed under a condition. A condition may define that if a state is in a certain state, then the action can be executed.

In one embodiment, if a condition is met, then the corresponding action may execute. For example, an action may be "log in." If the current state is "logged in" with a Boolean value that equals "false," then based on that condition, then the action of "log in" can be executed, which may execute code in one or more modules for authentication and authorization. For further example, the invoice domain may include an action of "create invoice." The "create invoice" action may have a condition that a user must be "logged in" before a user is authorized to create an invoice.

In one embodiment, the state generator module 220 creates an abstraction of an application. For example, the graph data 241 may represent a model of an application, which may represent the application in its abstraction. In one embodiment, the state generator module 220 first scans through all of the actions of an application, and then recursively examines the methods of the actions. For example, suppose a method is "create invoice." Prior to executing the creation of an invoice, a condition that might need to be met is a state of logged in to the application. If the state is not logged in to the application, then the condition is not met and the invoice is not created. Because the state cannot be met due to the condition, the state can be considered inapplicable, and a next state can be examined. The next state to be examined may be an authorization state, such as "is authorized." An action associated with the authorization state may be "log in." The log in action may have no conditions, such as there is no true or false value that is a precondition to the action. Thus, the action of log in can be executed as applicable, so the action may execute and create a state called "logged in." The logged in state may be a new state that was enabled due to the log in action.

In this example, a new node for the new state is created in the graph data 241. This new node may be labeled as "logged in" state. It may be connected to an initial node that may be labeled as "not logged in" state. In one embodiment, the initial state and the new state are connected in the graph data 241 with an edge labeled as "log in" action, which is an action method that can be executed.

In one embodiment, the graph data 241 represents a model of an application. A model may store a current state of an application. In one embodiment, a model includes a set of variables, such as an integer, a Boolean, a set of complex objects, and the like. In one embodiment, a model holds data of values which represent the states of the application. In one embodiment, the model is represented by state model data determined by the state model module 215.

In one embodiment, the graph data 241 includes action configurations. In one embodiment, for each module of a project of an application, the action configurations may be stored as a code file that has methods representing actions. Each action may be executed based on the state of the application represented by the graph data 241. In one embodiment, the action configurations are represented by action configuration data determined by the action configuration module 210. In one embodiment, the action configuration data represents test cases of machine-readable code. For example, a domain such as invoices may have forty methods of test cases, which may be considered a subset of real-life scenarios. It is to be understood that an example of forty methods illustrates the manageability of such methods by invoice domain experts and is not to be limiting. Such manageability is further illustrated by the example of modifying two methods of the forty total invoice methods over a period of a month. It is to be further understood that having a defined count of methods enables a limitation to the number of states that will be generated as nodes of the finite state machine.

In one embodiment, the state generator module 220 recursively examines the state model data determined by the state model module 215 and the action configuration data determined by the action configuration module 210. Each action of the action configuration data that is executed causes a state to be generated and stored in the graph data 241. In one embodiment, the state generator module 220 may examine each applicable action configuration file. The state generator module 220 may examine each applicable method of the action configuration file. The state generator module 220 may examine the conditions associated with the applicable method, such as a condition that defines that a model is having a particular value for the applicable variables or set of variables that enables the action. In one embodiment, if the state generator module 220 determines that a particular action is enabled, then the state generator module 220 generates a new state as a new node in the graph and stores the new state in the graph data 241.

In one embodiment, the graph data 241 of the graph database 240 may include nodes and edges of a finite state machine. For example, a graph of the graph data 241 may start from a particular state. A node may include certain values of variables that represent the state. For example, a node may have an identifier, one or more company settings, one or more invoice settings, and a traverse count, such as a traverse count of one. For further example, a node may include a logged in setting, such as a Boolean variable. The logged in setting, for example, may be set to false. For further example, a node may include a state transition, such as an action configuration. An action configuration associated with the logged in variable may be "log in," which may be a method under the associated action configuration.

In one embodiment, the state may change with just one variable change, such as a change of logged in to true. With such changes, a complex state of an application may be generated by the state generator module 220. The state generator module 220 can validate a current state and determine which action can be executed based on the current state. In one embodiment, the state generator module 220 recursively examines states, such that after reaching a state, the cycle of validating a state and determining an action repeats. Such recursion can include examining the action configurations again and examining all of the related methods again and determining if there are any valid states that can be generated. It is to be understood that such recursive examination of the graph data 241 would traditionally go on endlessly, without limitation through infinite recursive cycles. Under embodiments of the disclosure, the action configuration module 210 and the state model module 215 define filters that cause the recursions to be finite. For example, if a state was already generated by the state generator module 220, then it is not generated again with a regeneration process. Furthermore, if an edge already exists, then it is not recreated by the state generator module 220. In one embodiment, such limitations of generation of nodes and edges generates a finite state machine represented by the graph data 241.

In one embodiment, the test engine system 120 includes a state traverser module 250. The state traverser module 250 is configured to traverse through the graph data 241 that represents the graph generated by the state generator module 220. In one embodiment, the state traverser module 250 follows rules embedded in the graph data 241 through the edges of the graph. In one embodiment, states have been generated by the state generator module 220 and stored as a model as graph data 241. In one embodiment, the state traverser module 250 performs traversals that may represent use cases. In one embodiment, traversal mode algorithms are utilized, as is known by those skilled in the art. Examples of traversal mode algorithms include, but are not limited to, cover all once, follow production, defect density, random, module focused, user profile focused, profile focused, and the like. In one embodiment, the state traverser module 250 utilizes a traversal mode algorithm to traverse the graph data 241. For example, a traversal mode algorithm of cover all once can include examining each node once and examining each edge once. A follow production traversal mode algorithm may follow a traversal that a user of an application may follow. A defect density traversal mode algorithm may include focusing a traversal on where defects are appearing, such as between two nodes.

In one embodiment, a traversal mode algorithm is selected. For example, if an application is being modified, then a traversal mode algorithm of cover all once may be selected in order to traverse all the nodes and the edges of a graph at least once. For further example, after a modification to an application is implemented into a production environment, then a traversal mode algorithm of follow production may be selected in order to traverse the most common nodes of a graph as represented by field usage.

In one embodiment, the test engine system 120 includes a model traversal metric module 255. The model traversal metric module 255 stores traversal history data of the nodes and edges that were traversed in the graph data 241. In one embodiment, the model traversal metric module 255 stores a clone of the graph data 241. For example, the model traversal metric module 255 may store the number of times that a node has been traversed by the state traverser module 250. It is to be understood that such metrics may be stored in a database of the model traversal metric module 255 or, alternatively, may be stored in the graph database 240, such as storing the metrics with each node of the graph data 241. In one embodiment, the traversal history data is displayed, for example, on a dashboard for test managers. Such a dashboard may help test managers to understand the coverage of a traversal, such as which nodes and edges were traversed by the state traverser module 250, when they were traversed, how many defects were found by the traversal, and the like.

In one embodiment, the test engine system 120 includes a model traversal configuration module 235. The model traversal configuration module 235 provides predicted pattern data to the state traverser module 250 that enables a chosen traversal mode to guide a traversal. For example, if a traversal mode is to follow production, then the model traversal configuration module 235 provides the state traverser module 250 with production data to follow production usage.

In one embodiment, the test engine system 120 includes a machine learning engine module 230. In one embodiment, the machine learning engine module 230 is used to predict the next action of a traversal. In one embodiment, the machine learning engine module 230 is used for predicting the calculation values on assertions. In one embodiment, the machine learning engine module 230 is used for processing the input from production usage feedback.

In one embodiment, the machine learning engine module 230 receives data from an action feedback module 205. In one embodiment, the action feedback module 205 provides action feedback data representing the users' production usage of the application, such as field usage data. For example, users may consistently utilize a state flow in the application's production environment from a state A to a state B to a state D to a state E (now shown). Such a state flow may represent a popularity within the usage of the production environment of an application, and the machine learning engine module 230 may determine that state flow based on the action feedback data of the action feedback module 205. The model traversal configuration module 235 may store the state flow as predicted pattern data. The state traverser module 250 may then traverse graph data 241 based on the state flow of the predicted pattern data.

In one embodiment, the action feedback module 205 determines feedback actions in the production environment of the application. For example, if the application were a financial management system, an action of a user in the production environment may be to access company data. The user may, for example, log in to the application in order to access the company data. After logging in, the user may create a few invoices, such as two to three invoices on average per day. After creating the invoices, the user may check on the company's chart of accounts. After checking on the chart of accounts, the user may create a few customers, such as one or two customers on average per day. After creating the customers, the user may log off. Such a user scenario of daily interaction with the application may be captured by the action feedback module 205 and stored as action feedback data.

It is to be understood that action feedback data is not restricted to a day, as it may be any time period, such as usage patterns that tend to occur in a week or a month. The sequence of states and actions that are logged by the action feedback module 205 may be analyzed by the machine learning engine module 230 and the most important actions and states can be determined as predicted pattern data. Such predicted pattern data can be a summary of millions or more users of an application, for example. Such predicted pattern data can also be targeted to a specific type of user of an application, such as an accountant, or specific type of company of an application, such as a manufacturer. The model traversal configuration module 235 may convert the actions and states into nodes and edges of a graph, which can be represented as predicted pattern data. The state traverser module 250 can utilize the predicted pattern data to traverse the graph data 241.

In one embodiment, the model traversal configuration module 235 may store a clone of the graph data 241. In one embodiment, the model traversal configuration module 235 defines the traversal to be followed by the state traverser module 250. For example, the importance of certain nodes of a graph can be determined based on production usage, and that importance can be stored by the model traversal configuration module 235 as predicted pattern data. Similarly, the importance of certain edges of a graph can be determined based on production usage, and that importance can be stored by the model traversal configuration module 235 as predicted pattern data. The prediction pattern data may be utilized by the state traverser module 250 based on the chosen traversal mode, such as follow production.

It is to be understood that different traversal modes may be chosen based on the state. For example, if an application has been deployed, the chosen traversal mode may be continuous testing with follow production in which the production environment is being monitored by the action feedback module 205 and being interpreted by the machine learning engine module 230. For further example, when a new feature of an application is being developed, prior to release of that new feature, the chosen traversal mode may be cover all once to assess the impact of the new feature on the whole application.

In one embodiment, the machine learning engine module 230 determines predictions based on action feedback data from the production environment of the application, as determined by the action feedback module 205. In one embodiment, the machine learning engine module 230 utilizes action feedback data from the action feedback module 205. In one embodiment, the action feedback data is processed by training algorithms of the machine learning engine module 230, and the training algorithms predict what actions need to be executed by the state traverser module 250. Such predictions may be represented by next action prediction data. In one embodiment, the state traverser module 250 utilizes the next action prediction data from the machine learning engine module 230 to determine the next action to be traversed in the graph data 241.

In one embodiment, the model traversal configuration module 235 is being continuously updated by the machine learning engine module 230 with predicted pattern data. In some embodiments, the algorithms utilized by the machine learning engine module 230 are regression based algorithms, instance based algorithms, and the like. In some embodiments, the algorithms utilized by the machine learning engine module 230 are deep learning algorithms, information learning algorithms, and the like. Such algorithms may be beneficial to analyze patterns from the continuous data flow from the action feedback module 205 that records production usage.

In one embodiment, the state traverser module 250 generates test case data that represents at least one abstracted action associated with a state. The test case data is generated by the state traverser module 250 from the traversal by the state traverser module 250 of a model of the application. In one embodiment, the model of the application includes states and combinations of state flows. In one embodiment the test case data defines the actions that can be executed to move from one state to another. In one embodiment, the state traverser module 250 translates use case data of the model traversal configuration module 235 into test case data.

In one embodiment, the test engine system 120 includes a test execution adapter module 260. In one embodiment, the test execution adapter module 260 is a layer that connects to a service of various projects that provides for modular automated tests. In one embodiment, the test execution adapter module 260 maintains the states of an execution of an application. In one embodiment, the test execution adapter module 260 routes and delegates automation scenarios to be executed by respective projects of the application. In one embodiment, the test execution adapter module 260 receives test case data from the state traverser module 250. In one embodiment, the test execution adapter module 260 receives validation expectation data from the machine learning engine module 230.

In one embodiment, the test execution adapter module 260 interacts with a project of an application. For example, the test execution adapter module 260 may implement automation as a service for each project of an application. In one embodiment, a project may be associated with an application. For example, if a team of engineers is working on an invoice project of a financial management system, the project may have automation implemented as exposed endpoints. Under this example, an endpoint may be for creating invoices. In one embodiment, endpoints may have operations such as create, read, update, delete, and the like.

In one embodiment, the test engine system 120 includes a project endpoint module 270. In one embodiment, the project endpoint module 270 includes a plurality of projects, such as a first project 271A, a second project 271B, and an Nth project 271N. It is to be understood that the project endpoint module 270 may include any number of projects 271. In one embodiment, each project 271 has an endpoint exposed to the test execution adapter module 260.

In one embodiment, the test execution adapter module 260 monitors for test cases from the state traverser module 250. In one embodiment, a test case is an event. In one embodiment, when the state traverser module 250 moves from one state to another through an action, the state traverser module 250 transmits an event of the applicable test case data, which may be a notification to execute an action. Such an action may be an abstracted action of the state. The test execution adapter module 260 matches the test case data to an applicable endpoint of a project 271 via the applicable project endpoint. For example, test case data may be related to an invoice domain of a financial management system. In one embodiment, the test execution adapter module 260 routes the test case data to the projects 271 related to the invoice domain, such as the projects 271 that perform actions on invoices. The automation implemented on the project 271 may perform the project test case execution via the applicable endpoint. In one embodiment, the project endpoint module 270 returns project test results of the project test execution to the test execution adapter module 260. For example, a project test result may be that a test has passed or failed. Such a result may be compared to validation expectation data of the machine learning engine module 230. In one embodiment, the test execution adapter module 260 generates reports of the returned project test results.

In one embodiment, the test execution adapter module 260 brokers the transmission of the test case data from the state traverser module 250 and a test automation endpoint of a project 271 of the project endpoint module 270. In one embodiment, an endpoint exposes services of a project 271, such as web services. For example, a web service of a project 271 may be listening for test case data from the test execution adapter module 260. The test case data may include sufficient information necessary for the project 271 to execute the test case. For example, the test case data may include information sufficient to create an invoice for a first project 271A related to invoices. It is to be understood that an endpoint may include, in lieu of a service, coding automation that listens to the test execution adapter module 260.

In one embodiment, the test execution adapter module 260 receives predicted validation expectation data from the machine learning engine module 230. In one embodiment, the predicted validation expectation data may represent assertion expected states, values prediction machine learning regression, and the like. In one embodiment, the predicted validation expectation data may be utilized by the test execution adapter module 260 to validate the project test results of the project endpoint module 270. In one embodiment, the predicted validation expectation data represents an expected state after an action is performed, such as a create invoice action.

Figure 3:
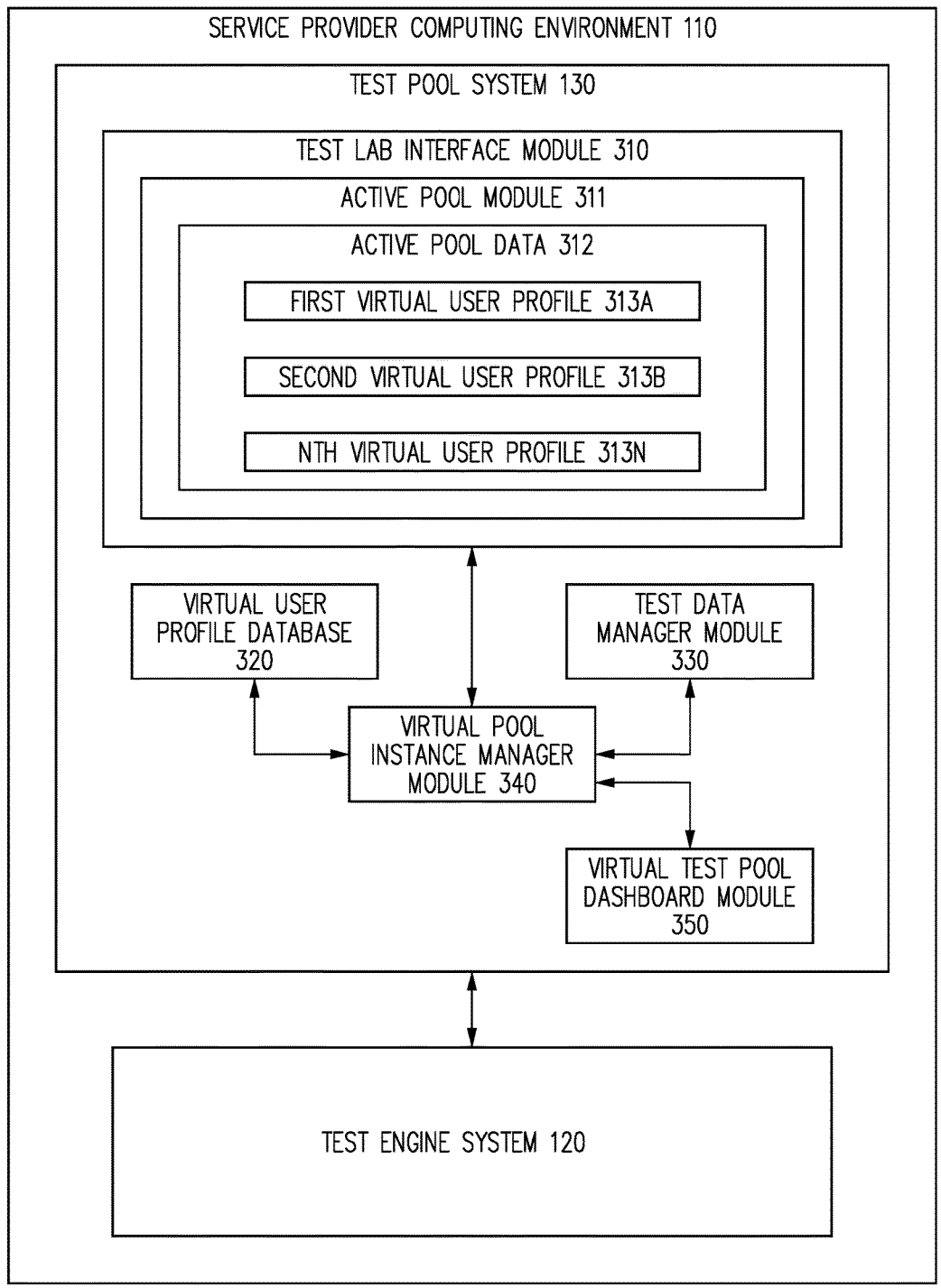
FIG. 3 is a functional block diagram of a production environment for state based intelligent test generation, in accordance with various embodiments.

FIG. 3 is a functional block diagram of a production environment 100 for state based intelligent test generation, in accordance with various embodiments. Referring to FIGS. 2, and 3 together, the service provider computing environment 110 includes a test pool system 130. In one embodiment, the test pool system 130 utilizes the test engine system 120 to replicate the usage patterns of users of different profiles and execute the usage patterns in a test environment. In one embodiment, the test pool system 130 is continuously active, similar to a production environment of an application in which users actively use the application. In one embodiment, the test pool system 130 enables a tester to choose a type of user, and trigger a test of the application based on the type of user.

In one embodiment, the test pool system 130 includes a test lab interface module 310. In one embodiment, the test lab interface module 310 includes an active pool module 311. In one embodiment, the active pool module 311 includes a storage of active pool data 312, which may include a plurality of virtual user profiles 313 such as a first virtual user profile 313A, a second virtual user profile 313B, an Nth virtual user profile 313N, and so on. It is to be understood that there may be any number of virtual user profiles 313 of the active pool data 312. In one embodiment, the test pool system 130 includes a virtual pool instance manager module 340, a virtual user profile database 320, a test data manager module 330, and a virtual test pool dashboard module 350.

In one embodiment, the test lab interface module 310 enables a tester to select various parameters related to a test case, such as the type of user, the type of industry, the type of company, and the like. The tester's selection may be stored as a virtual user profile 313 of the active pool data 312. For example, there may have been a first virtual user profile 313A already added to the active pool data 312, and the tester's selection is added as a second virtual user profile 313B. Under this example, the first virtual user profile 313A and the second virtual user profile 313B are used by the virtual pool instance manager module 340 to trigger two instances of testing by the test engine system 120. The tester may initiate the testing by the test engine system 120 via the virtual test pool dashboard module 350. When the tests are complete, the results of the tests may be displayed to the tester via the virtual test pool dashboard module 350. Such testing allows for parallel testing of a plurality of virtual user profiles 313 within a broad coverage of an application in a relatively short amount of time. The test pool system 130 may enable a tester to gain confidence that the tester's changes to an application are valid. Such increases the velocity of development of an application.

In one embodiment, the virtual user profile database 320 stores a plurality of virtual user profiles that may be utilized by the test lab interface module 310. For example, the parameters stored in the virtual user profile database 320 may be displayed to the tester via the test lab interface module 310 to allow a tester to select a virtual user profile 313. In one embodiment, the test data manager module 330 enables a tester to define administrative data. The administrative data may include, for example, credential information such as a user name, a user password, a company identifier, and the like. Such administrative data provides the necessary data for a test to execute within a project 271.

In one embodiment, the virtual pool instance manager module 340 interfaces with the state traverser module 250. Such an interface may cause a traversal of the graph data 241. In one embodiment, the virtual pool instance manager module 340 interfaces with the test execution adapter module 260. Such an interface may provide the test execution adapter module 260 with the administration data that is required by a project 271 in order to launch testing.

In one embodiment, the virtual test pool dashboard module 350 provides dashboard information about the testing being executed by the test engine system 120. For example, the virtual test pool dashboard module 350 may allow a tester to request commencement of testing. For further example, the virtual test pool dashboard module 350 may provide a visualization of the stage that a test is currently in, such as a progress bar of states traversed. For further example, the virtual test pool dashboard module 350 may provide a count of the number of instances of testing that are currently being undertaken. For further example, the virtual test pool dashboard module 350 may provide a display of defects that have been identified within a project 271.

Figure 4:
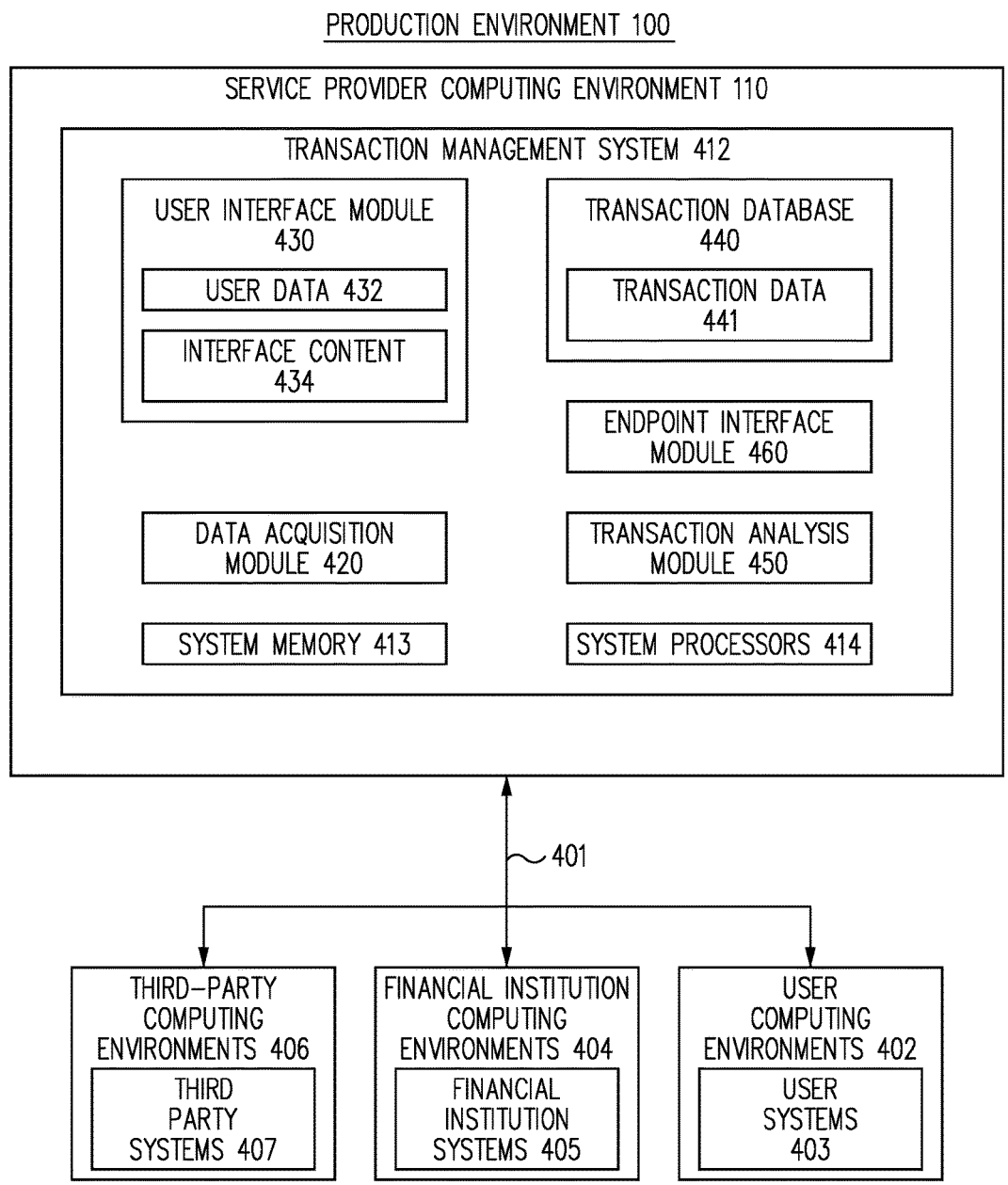
FIG. 4 is a functional block diagram of a production environment for state based intelligent test generation, in accordance with various embodiments.

FIG. 4 is a functional block diagram of a production environment 100 for state based intelligent test generation, in accordance with various embodiments. Referring to FIGS. 1, 2, 3, and 4 together, the service provider computing environment 110 includes a transaction management system 412, which is configured to provide transaction management services to a plurality of users. It is to be understood that the transaction management system 412 is an example of an application that may be under development or may be undergoing modification and that may be tested with the test engine system 120 and the test pool system 130, according to various embodiments. For example, a developer or a team of developers may be working on a project to modify an application, such as by changing or modifying a module of the application. In one embodiment, such a project corresponds to the first project 271A. In one embodiment, such an application corresponds to the transaction management system 412. In one embodiment, the transaction management system 412 includes an endpoint interface module 460 that is utilized by the project endpoint module 270 to execute tests as defined by the test execution adapter module 260.

In one embodiment, the data generator module 200 receives transaction data 441 from the transaction database 440. For example, if the transaction management system 412 includes a domain of invoice, the transaction data 441 may include information such as quantity of invoices, invoice numbers, customer numbers, product numbers, quantities of products, and prices. Such information would be used by the state model module 215 to create filters of invoice data for the generation of states by the state generator module 220.

In one embodiment, the action feedback module 205 receives transaction data 441 from the transaction database 440. For example, if the transaction management system 412 includes a domain of invoice, the transaction data 441 may include information such as quantity of invoices created by a user over a certain time period, such as a day. In one embodiment, the transaction data 441 includes information indicative of a flow of state transitions. For example with respect to an invoice domain, the transaction data 441 may include information indicative of a state prior to a user creating an invoice, such as creating a customer record, and may include information indicative of a state after the user creates an invoice, such as generating an accounts receivable report. In one embodiment, information about state flows are utilized by the machine learning engine module 230 to generate predicted pattern data and next action prediction data for use by the state traverser module 250.

It is to be understood that the diagram of FIG. 4 is for exemplary purposes and is not meant to be limiting. For example, the transaction management system 412 may apply to any manner of transactions, such as social media posting transaction management, financial transaction management, real estate transaction management, governmental electronic governance transaction management, and the like. In one embodiment, a transaction can include, but is not limited to, any operation through which ownership or control of any item or right is transferred from one party to another party. For example, one specific illustrative example of a transaction is a financial transaction.

The production environment 100 includes a service provider computing environment 110, user computing environments 402, financial institution computing environments 404, and third-party computing environments 406, according to various embodiments. The computing environments 110, 402, 404, and 406 are communicatively coupled to each other with one or more communication channels 401, according to various embodiments. Communication channels 401 may include one or more physical or virtual networks.

According to one embodiment, the transaction management system 412 is an electronic financial accounting system that assists users in bookkeeping or other financial accounting practices. Additionally, or alternatively, the transaction management system 412 can manage one or more of tax return preparation, banking, investments, loans, credit cards, real estate investments, retirement planning, bill pay, and budgeting. The transaction management system 412 can be a standalone system that provides transaction management services to users. Alternatively, the transaction management system 412 can be integrated into other software or service products provided by a service provider. In one embodiment, the service provider computing environment 110 includes system memory 413 and system processors 414.

In one embodiment, the transaction management system 412 can assist users in tracking expenditures and revenues by retrieving transaction data related to transactions of users. The transaction management system 412 may include a data acquisition module 420, a user interface module 430, a transaction database 440, and a transaction analysis module 450, according to various embodiments.

The user computing environments 402 correspond to computing environments of the various users of the transaction management system 412. The user computing environments 402 may include user systems 403. The users of the transaction management system 412 utilize the user computing environments 402 to interact with the transaction management system 412. The users of the transaction management system 412 can use the user computing environments 402 to provide data to the transaction management system 412 and to receive data, including transaction management services, from the transaction management system 412.

The user interface module 430 of the transaction management system 412 is configured to receive user data 432 from the users, according to one embodiment. The user data 432 may be derived from information, such as, but not limited to a user's name, personally identifiable information related to the user, authentication data that enables the user to access the transaction management system, or any other types of data that a user may provide in working with the transaction management system 412.

In one embodiment, the user interface module 430 provides interface content 434 to the user computing environments 402. The interface content 434 can include data enabling a user to obtain the current status of the user's financial accounts. For example, the interface content 434 can enable the user to select among the user's financial accounts in order to view transactions associated with the user's financial accounts. The interface content 434 can enable a user to view the overall state of many financial accounts. The interface content 434 can also enable a user to select among the various options in the transaction management system 412 in order to fully utilize the services of the transaction management system 412.

In one embodiment, the transaction management system 412 includes a transaction database 440. The transaction database 440 includes the transaction data 441. The transaction data 441 may be derived from data indicating the current status of all of the financial accounts of all of the users of the transaction management system 412. Thus, the transaction database 440 can include a vast amount of data related to the transaction management services provided to users. In one embodiment, when the user utilizes the user interface module 430 to view interface content 434, the interface content 434 includes the transaction data 441 retrieved from the transaction database 440.

In one embodiment, the data acquisition module 420 is configured to use the financial institution authentication data provided in the user data 432 to acquire transaction data 441 related to transactions of the users from the financial institution systems 405 of the financial institution computing environments 404. In addition, the data acquisition module 420 may use the financial institution authentication data to log into the online services of third-party computing environments 406 of third-party institutions in order to retrieve transaction data 441 related to the transactions of users of the transaction management system 412. The data acquisition module 420 accesses the financial institutions by interfacing with the financial institution computing environments 404. The transaction data of the financial institution systems 405 may be derived from bank account deposits, bank account withdrawals, credit card transactions, credit card balances, credit card payment transactions, online payment service transactions, loan payment transactions, investment account transactions, retirement account transactions, mortgage payment transactions, rent payment transactions, bill pay transactions, budgeting information, or any other types of transactions. The data acquisition module 420 is configured to gather the transaction data 441 from financial institution computing environments 404 related to financial service institutions with which one or more users of the transaction management system 412 have a relationship.

In one embodiment, the data acquisition module 420 is configured to acquire data from third-party systems 407 of third-party computing environments 406. The data acquisition module 420 can request and receive data from the third-party computing environments 406 to supply or supplement the transaction data 441, according to one embodiment. In one embodiment, the third-party computing environments 406 automatically transmit transaction data to the transaction management system 412 (e.g., to the data acquisition module 420), to be merged into the transaction data 441. The third-party computing environment 406 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

The data acquisition module 420 of the transaction management system 412 may be configured to receive from the financial institution systems 405 one or more transactions associated with the user. The data acquisition module 420 may store the received transactions as transaction data 441. The transaction analysis module 450 of the transaction management system 412 may analyze the transactions stored as the transaction data 441.

Process

Figure 5A:
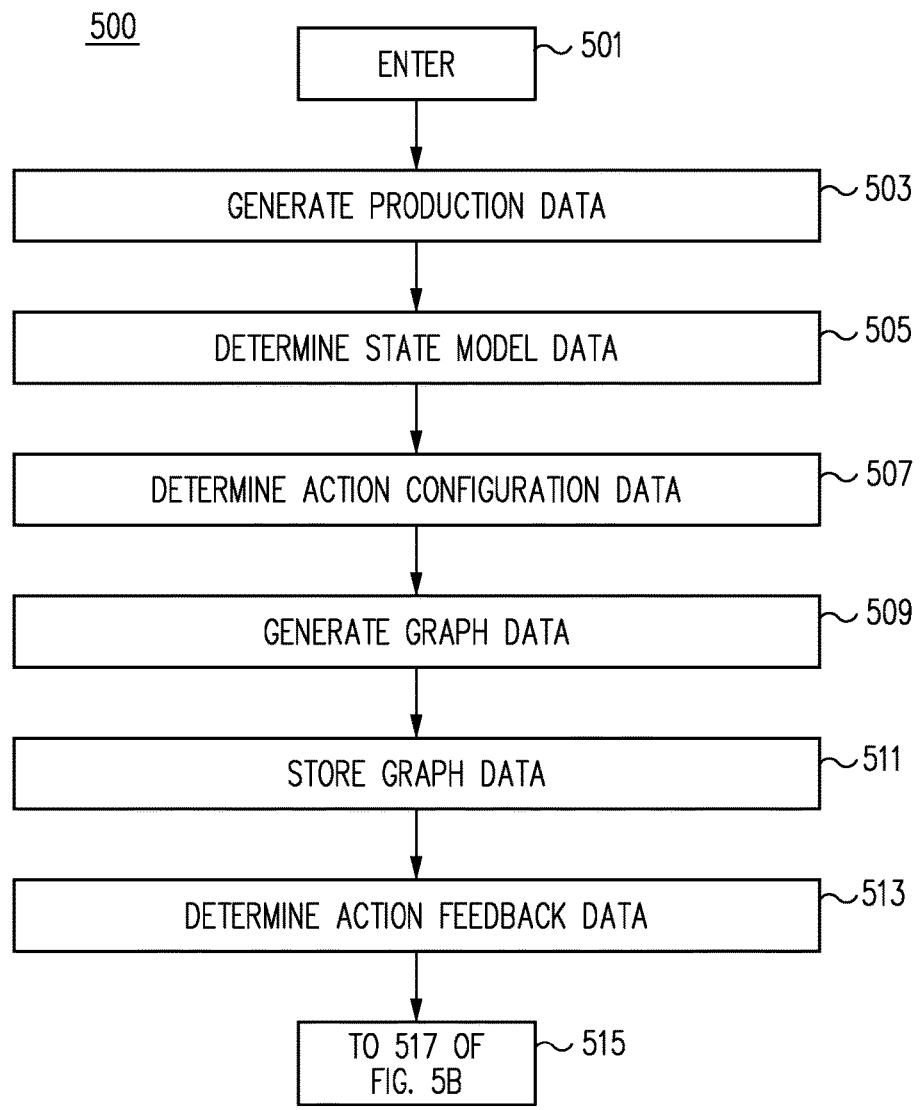
FIGS. 5A and 5B are flow diagrams of a process for state based intelligent test generation, in accordance with various embodiments.
Figure 5B:
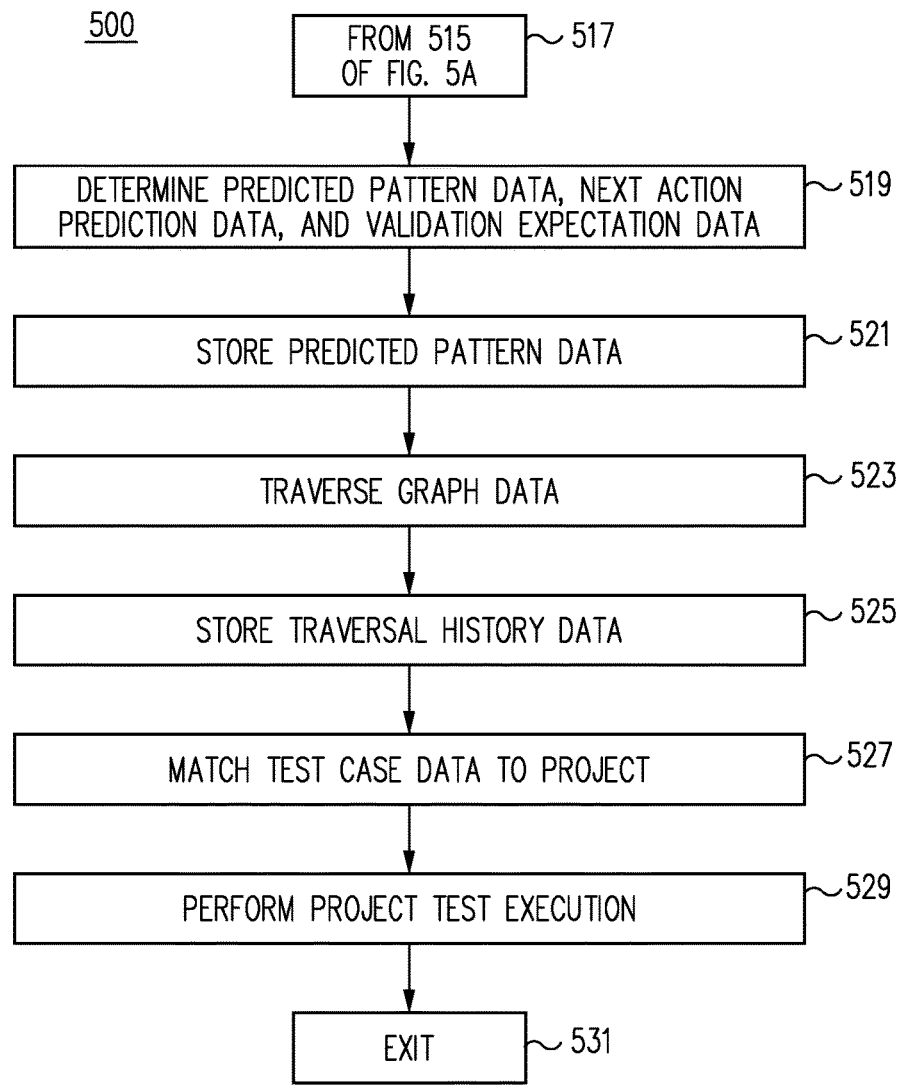

FIGS. 5A AND 5B are flow diagrams of a process 500 for state based intelligent test generation, in accordance with various embodiments. Referring to FIGS. 2, 3, 5A and 5B together, the process 500 for state based intelligent test generation begins at ENTER OPERATION 501 and process flow proceeds to GENERATE PRODUCTION DATA OPERATION 503.

In one embodiment, at GENERATE PRODUCTION DATA OPERATION 503, the data generator module 200 is configured to generate production data representing a plurality of variables of at least one application. In one embodiment, the production data is a representation of the data that users of an application create while using an application in a production environment.

In one embodiment, once the production data is generated by the data generator module 200 at GENERATE PRO- DUCTION DATA OPERATION 503, process flow proceeds to DETERMINE STATE MODEL DATA OPERATION 505.

In one embodiment, at DETERMINE STATE MODEL DATA OPERATION 505, a state model module 215 is configured to determine state model data that represents an abstraction of states of the at least one application. In one embodiment, the determination is based on the production data.

In one embodiment, once the state model data is determined by the state model module 215 at DETERMINE STATE MODEL DATA OPERATION 505, process flow proceeds to DETERMINE ACTION CONFIGURATION DATA OPERATION 507.

In one embodiment, at DETERMINE ACTION CONFIGURATION DATA OPERATION 507, the action configuration module 210 is configured to determine action configuration data that represents an abstraction of actions of the at least one application.

In one embodiment, once the action configuration data is determined by the action configuration module 210 at DETERMINE ACTION CONFIGURATION DATA OPERATION 507, process flow proceeds to GENERATE GRAPH DATA OPERATION 509.

In one embodiment, at GENERATE GRAPH DATA OPERATION 509, the state generator module 220 is configured to generate graph data 241 that represents an abstraction of the at least one application. In one embodiment, the graph data 241 includes nodes of a finite state machine. In one embodiment, the nodes of the finite state machine are limited by the state model data. In one embodiment, the graph data 241 is generated based on the state model data. In one embodiment, the graph data 241 includes edges of a finite state machine. In one embodiment, the edges of the finite state machine are limited by the action configuration data. In one embodiment, the graph data 241 is generated based on the action configuration data.

In one embodiment, once the graph data 241 is generated by the state generator module 220 at GENERATE GRAPH DATA OPERATION 509, process flow proceeds to STORE GRAPH DATA OPERATION 511.

In one embodiment, at STORE GRAPH DATA OPERATION 511, the graph database 240 stores the graph data 241.

In one embodiment, once the graph data 241 is stored by the graph database 240 at STORE GRAPH DATA OPERATION 511, process flow proceeds to DETERMINE ACTION FEEDBACK DATA OPERATION 513.

In one embodiment, at DETERMINE ACTION FEEDBACK DATA OPERATION 513, an action feedback module 205 is configured to determine action feedback data that represents a pattern of usage by a plurality of users of the at least one application.

In one embodiment, once the action feedback data is determined by the action feedback module 205 at DETERMINE ACTION FEEDBACK DATA OPERATION 513, process flow proceeds at TO 517 OF FIG. 5B OPERATION 515.

In one embodiment, once process flow proceeds at TO 517 OF FIG. 5B OPERATION 515 of FIG. 5A, process flow proceeds at FROM 515 OF FIG. 5A OPERATION 517 of FIG. 5B.

In one embodiment, once process flow proceeds at FROM 515 OF FIG. 5A OPERATION 517, process flow proceeds to DETERMINE PREDICTED PATTERN DATA, NEXT ACTION PREDICTION DATA, AND VALIDATION EXPECTATION DATA OPERATION 519.

In one embodiment, at DETERMINE PREDICTED PATTERN DATA, NEXT ACTION PREDICTION DATA, AND VALIDATION EXPECTATION DATA OPERATION 519, the machine learning engine module 230 is configured to determine predicted pattern data that represents a predicted pattern of usage based on the action feedback data. In one embodiment, the machine learning engine module 230 is configured to determine next action prediction data that represents a next action prediction based on the action feedback data. In one embodiment, the machine learning engine module 230 is configured to determine validation expectation data representing a predicted validation expectation based on the action feedback data.

In one embodiment, once the predicted pattern data, the next action prediction data, and the validation expectation data is determined by the machine learning engine module 230 at DETERMINE PREDICTED PATTERN DATA, NEXT ACTION PREDICTION DATA, AND VALIDATION EXPECTATION DATA OPERATION 519, process flow proceeds to STORE PREDICTED PATTERN DATA OPERATION 521.

In one embodiment, at STORE PREDICTED PATTERN DATA OPERATION 521, the model traversal configuration module 235 is configured to store the predicted pattern data.

In one embodiment, once the predicted pattern data is stored by the model traversal configuration module 235 at STORE PREDICTED PATTERN DATA OPERATION 521, process flow proceeds to TRAVERSE GRAPH DATA OPERATION 523.

In one embodiment, at TRAVERSE GRAPH DATA OPERATION 523, the state traverser module 250 is configured to traverse the graph data 241. In one embodiment, the traversal is based on the predicted pattern data. In one embodiment, the traversal is based on the next action prediction data. In one embodiment, the state traverser module 250 is configured to generate test case data that represents at least one abstracted action associated with a state of the at least one application.

In one embodiment, a virtual user profile database 320 is configured to store virtual user profile data representing a plurality of profiles of virtual users. In one embodiment, a test lab interface module 310 is configured to receive from a tester selection data representing a selection from the virtual user profile data. In one embodiment, an active pool module 311 is configured to generate active pool data 312 based on the selection data. In one embodiment, an active pool module 311 is configured to store active pool data 312 based on the selection data. In one embodiment, a virtual pool instance manager module 340 is configured to interact with the state traverser module 250 to launch a traversal of the graph data 241 based on the active pool data 312.

In one embodiment, once the graph data 241 is traversed by the state traverser module 250 at TRAVERSE GRAPH DATA OPERATION 523, process flow proceeds to STORE TRAVERSAL HISTORY DATA OPERATION 525.

In one embodiment, at STORE TRAVERSAL HISTORY DATA OPERATION 525, the model traversal metric module 255 is configured to store traversal history data that represents a history of traversals of the graph data 241. In one embodiment, a next traversal path is determined based on the traversal history data. In one embodiment, a determined next traversal path is not stored in the traversal history data. In one embodiment, a determined next traversal path is a new traversal path that has not yet been traversed.

In one embodiment, once the traversal history data is stored by the model traversal metric module 255 at STORE TRAVERSAL HISTORY DATA OPERATION 525, process flow proceeds to MATCH TEST CASE DATA TO PROJECT OPERATION 527.

In one embodiment, at MATCH TEST CASE DATA TO PROJECT OPERATION 527, the test execution adapter module 260 is configured to match the test case data to a project 271 of the at least one application. In one embodiment, the match is based on the validation expectation data.

In one embodiment, a test data manager module 330 is configured to manage test administration data representing test administration credentials associated with the virtual user profile data. In one embodiment, the virtual pool instance manager module 340 is configured to interact with the test execution adapter module 260 to enable authentication through the endpoint based on the test administration data.

In one embodiment, once the event data is matched to the project by the test execution adapter module 260 at MATCH PROJECT TEST DATA TO PROJECT OPERATION 527, process flow proceeds to PERFORM PROJECT TEST EXECUTION OPERATION 529.

In one embodiment, at PERFORM PROJECT TEST EXECUTION OPERATION 529, a project endpoint module 270 is configured to perform a project test execution of the test case data. In one embodiment, the project test execution is performed through an endpoint of the project 271. In one embodiment, the project endpoint module 270 is configured to determine a project test result of the project test execution.

In one embodiment, a virtual test pool dashboard module 350 is configured to receive from the tester input data representing an instruction to begin testing and to display to the tester output data representing a test result of the testing.

In one embodiment, once the project test execution is performed by the project endpoint module 270 at PERFORM PROJECT TEST EXECUTION OPERATION 529, process flow proceeds to EXIT OPERATION 531.

In one embodiment, at EXIT OPERATION 531, the process 500 for state based intelligent test generation is exited.

Figure 6:
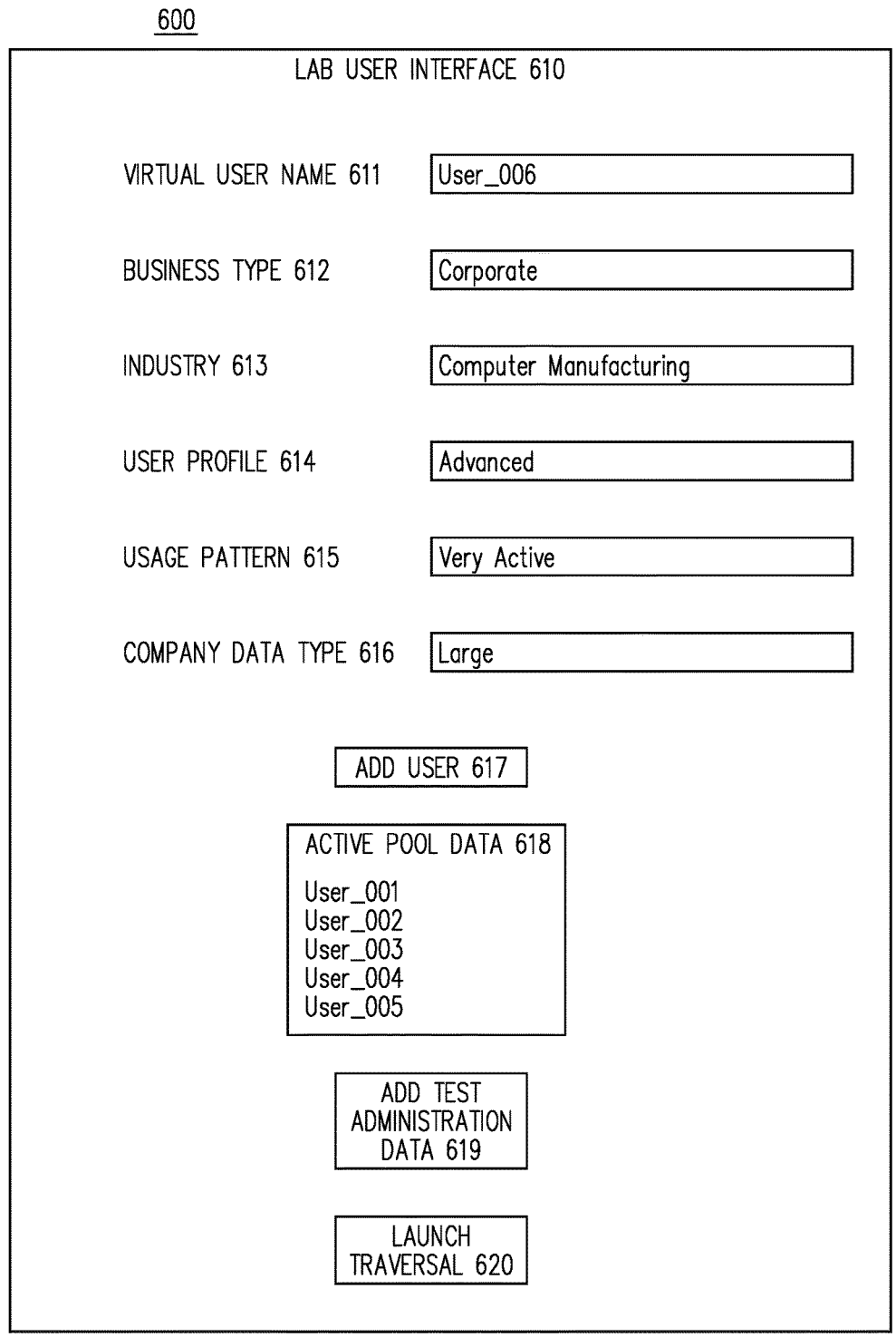
FIG. 6 is a data block diagram of an example interface for state based intelligent test generation, in accordance with various embodiments.

FIG. 6 is a data block diagram of an example interface 600 for state based intelligent test generation, in accordance with various embodiments. Referring to FIGS. 2, 3, and 6 together, the interface 600 includes a lab user interface 610. In one embodiment, the lab user interface 610 corresponds to the test lab interface module 310. In one embodiment, the lab user interface 610 includes a virtual user name field 611, which may have a value of "User 006." In one embodiment, the lab user interface 610 includes a business type field 612, which may have a value of "Corporate." In one embodiment, the lab user interface 610 includes an industry field 613, which may have a value of "Computer Manufacturing." In one embodiment, the lab user interface 610 includes a user profile field 614, which may have a value of "Advanced." In one embodiment, the lab user interface 610 includes a usage pattern field 615, which may have a value of "Very Active." In one embodiment, the lab user interface 610 includes a company data type field 616, which may have a value of "Large."

In one embodiment, the lab user interface 610 includes an add user control 617 and an active pool data store 618. In one embodiment, the active pool data store 618 corresponds to the active pool module 311. In one embodiment, the add user control 617 enables a user to add a virtual user profile to the active pool data store 618. For example, the active pool data store 618 may include virtual user profiles having virtual user names respectively of "User_001," "User_002," "User_003," "User_004," and "User_005." Under this example, when a user activates the add user control 617, a virtual user profile having a virtual user name of "User_006" may be added to the active pool data store 618.

In one embodiment, the lab user interface 610 includes an add test administration data control 619. In one embodiment, the test administration data is credential data such as user identifiers and user passwords that allows test interaction with applications. In one embodiment, a user activates the add test administration data control 619 so that the test data manager module 330 to collect, manage, and store test administration data. In one embodiment, the virtual pool instance manager module 340 transmits the test administration data to the test execution adapter module 260, so that the test administration data can be transmitted to a project 271 via the project endpoint module 270. For example, if the test administration data is a user identifier and a user password, the project endpoint module 270 may allow the first project 271A to perform a log in operation.

In one embodiment, the lab user interface 610 includes a launch traversal control 620. In one embodiment, a user activates the launch traversal control 620 so that the virtual pool instance manager module 340 instructs the state traverser module 250 to launch a traversal based on the active pool data 618. In one embodiment, when a user activates the launch traversal control 620, the virtual pool instance manager 340 transmits test administration data to the test execution adapter module 260.

State based intelligent test generation is a technical solution to a long standing technical problem. State based intelligent test generation is not an abstract idea for at least a few reasons. First, state based intelligent test generation is not an abstract idea because it is not merely an idea itself (e.g., can be performed mentally or using pen and paper). For example, it is not possible for the human mind to comprehend all of the possible permutations of the states of a complex application, even with pen and paper to assist the human mind. In contrast, the embodiments disclosed herein utilize and process special data related to testing procedures, special algorithms including machine learning algorithms, and customized user displays that are beneficial for the testing of applications undergoing development and modification. In addition, using the disclosed embodiments, a test engine system is provided that consistently, accurately, and efficiently tests applications undergoing development and modification that yields significant improvement to the technical fields of application testing management, data processing, data management, electronic financial management, data transmission, and user experience, according to one embodiment. The present disclosure adds significantly to the field of application testing services because the disclosed service provider system: increases the likelihood that a development defect introduced by a developer will be discovered before the defect is put into a production system; decreases the efforts of testing personnel to test changes that a developer introduces to an application; and decreases the processor consumption associated with such manual testing through guidance from machine-learning algorithms that provide targeted testing of complex states compared to the processor consumption of unguided, ad hoc testing.

Second, state based intelligent test generation is not an abstract idea because it is not a fundamental economic practice (e.g., is not merely creating a contractual relationship, hedging, mitigating a settlement risk, etc.). In contrast, the disclosed embodiments provide for the generation of state based intelligent testing that is essential for the prevention of defects being introduced into an application when a developer makes a change to the application. In addition, embodiments of the present disclosure allow for reduced use of processor cycles, memory, bandwidth, and power consumption associated with discovering defects through machine-learning modules that provide testing tailored to the applications, compared to unguided, ad hoc testing, and provide a solution to Internet and data processing problems. Consequently, computing and communication systems implementing or providing the embodiments of the present disclosure are transformed into more operationally efficient devices and systems.

Third, state based intelligent test generation is not an abstract idea because it is not a method of organizing human activity (e.g., managing a game of bingo), but is rather, in one embodiment, a tool for enabling a developer to assess the impact of a modification to an application through testing of the application based on a finite state machine. In addition, using the disclosed embodiments, an application test management system is provided that significantly improves the field of application test management systems by reducing the amount of time it takes for a developer to ascertain the impact that a modification may have on an application, according to one embodiment. Therefore, both human and non-human resources are utilized more efficiently.

Fourth, although mathematics may be used in state based intelligent test generation, the disclosed and claimed system and method of state based intelligent test generation is not an abstract idea because the system and method is not simply a mathematical relationship/formula. In contrast, the disclosed embodiments provide for the testing of applications undergoing modification by a developer that is essential for the deployment of an application to users being free of defects. In addition, using the disclosed embodiments, an application test management system is provided that increases loyalty to the application being tested because users find the application to be more reliable. This results in repeat customers, efficient data and transaction management services of the application, and reduced abandonment of use of the application, according to one embodiment.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for state based intelligent test generation for use with a data management service, comprising:
   a data generator module configured to generate production data representing a plurality of variables of at least one application;
   a state model module configured to determine state model data representing an abstraction of states of the at least one application based on the production data;
   an action configuration module configured to determine action configuration data representing an abstraction of actions of the at least one application;
   a state generator module configured to generate graph data representing an abstraction of the at least one application, the graph data comprising nodes and edges of a finite state machine based on the state model data and based on the action configuration data;
   a graph database configured to store the graph data;
   an action feedback module configured to determine action feedback data representing a pattern of usage by a plurality of users of the at least one application;
   a machine learning engine module configured to determine predicted pattern data representing a predicted pattern of usage based on the action feedback data, to determine next action prediction data representing a next action prediction based on the action feedback data, and to determine validation expectation data representing a predicted validation expectation based on the action feedback data;
   a model traversal configuration module configured to store the predicted pattern data;
   a state traverser module configured to traverse the graph data based on the predicted pattern data and the next action prediction data and to generate test case data representing at least one abstracted action associated with a state of the at least one application;
   a model traversal metric module configured to store traversal history data representing a history of traversals of the graph data;
   a test execution adapter module configured to match the test case data to a project of the at least one application based on the validation expectation data; and
   a project endpoint module configured to perform a project test execution of the test case data through an endpoint of the project and to determine a project test result of the project test execution.

2. The system of claim 1, further comprising:
   a virtual user profile database configured to store virtual user profile data representing a plurality of profiles of virtual users;
   a test lab interface module configured to receive, from a tester, selection data representing a selection from the virtual user profile data;
   an active pool module configured to store active pool data based on the selection data;
   a test data manager module configured to manage test administration data representing test administration credentials associated with the virtual user profile data;
   a virtual pool instance manager module configured to interact with the state traverser module to launch a traversal of the graph data based on the active pool data and to interact with the test execution adapter module to enable authentication through the endpoint based on the test administration data; and
   a virtual test pool dashboard module configured to receive, from the tester, input data representing an instruction to begin testing and to display, to the tester, output data representing a test result of the testing.

3. A method for state based intelligent test generation for use with a data management service, comprising:
   determining state model data representing an abstraction of states of at least one application;
   determining action configuration data representing an abstraction of actions of the at least one application;
   generating graph data representing an abstraction of the at least one application, the graph data comprising nodes and edges of a finite state machine based on the state model data and based on the action configuration data, wherein the nodes of the finite state machine are limited by the state model data, wherein the edges of the finite state machine are limited by the action configuration data;
   traversing the graph data to generate test case data representing an abstracted action associated with a state of the at least one application; and
   matching the test case data to a project of the at least one application.

4. The method of claim 3, further comprising:
   generating production data representing a plurality of variables of the at least one application, wherein determining the state model data is based on the production data.

5. The method of claim 3, wherein the project of the at least one application comprises a shared library of the at least one application.

6. The method of claim 3, further comprising:
   determining predicted pattern data representing a predicted pattern of usage; and
   storing the predicted pattern data, wherein traversing the graph data is based on the predicted pattern data.

7. The method of claim 6, further comprising:
   determining action feedback data representing a pattern of usage by a plurality of users of the at least one application, wherein determining the predicted pattern data is based on the action feedback data.

8. The method of claim 3, further comprising:
determining next action prediction data representing a next action prediction, wherein traversing the graph data is based on the next action prediction data.

9. The method of claim 8, further comprising:
determining action feedback data representing a pattern of usage by a plurality of users of the at least one application, wherein determining the next action prediction data is based on the action feedback data.

10. The method of claim 3, further comprising:
storing traversal history data representing a history of traversals of the graph data, wherein traversing the graph data comprises determining a next traversal path based on the traversal history data, wherein the next traversal path is not stored in the traversal history data.

11. The method of claim 3, further comprising:
determining validation expectation data representing a predicted validation expectation, wherein matching the test case data to the project is based on the validation expectation data.

12. The method of claim 11, further comprising:
determining action feedback data representing a pattern of usage by a plurality of users of the at least one application, wherein determining the validation expectation data is based on the action feedback data.

13. The method of claim 3, further comprising:
performing a project test execution of the test case data through an endpoint of the project to determine a project test result of the project test execution.

14. The method of claim 13, further comprising:
storing virtual user profile data representing a plurality of profiles of virtual users;
receiving, from a tester, selection data representing a selection from the virtual user profile data;
storing active pool data based on the selection data;
managing test administration data representing test administration credentials associated with the virtual user profile data;
launching a traversal of the graph data based on the active pool data and enabling authentication through the endpoint based on the test administration data; and
receiving, from the tester, input data representing an instruction to begin testing and displaying, to the tester, output data representing a test result of the testing.

15. A system for state based intelligent test generation for use with a data management service, comprising:
at least one processor; and
at least one memory coupled to the at least one processor, the at least one memory having stored therein instructions which when executed by any set of the at least one processor, perform a process for use with the transaction management service, the process including:
determining state model data representing an abstraction of states of at least one application;
determining action configuration data representing an abstraction of actions of the at least one application;
generating graph data representing an abstraction of the at least one application, the graph data comprising nodes and edges of a finite state machine based on the state model data and based on the action configuration data, wherein the nodes of the finite state machine are limited by the state model data, wherein the edges of the finite state machine are limited by the action configuration data;

traversing the graph data to generate test case data representing an abstracted action associated with a state of the at least one application; and
matching the test case data to a project of the at least one application.

16. The system of claim 15, further comprising:
generating production data representing a plurality of variables of the at least one application, wherein determining the state model data is based on the production data.

17. The system of claim 15, wherein the project of the at least one application comprises a shared library of the at least one application.

18. The system of claim 15, further comprising:
determining predicted pattern data representing a predicted pattern of usage; and
storing the predicted pattern data, wherein traversing the graph data is based on the predicted pattern data.

19. The system of claim 18, further comprising:
determining action feedback data representing a pattern of usage by a plurality of users of the at least one application, wherein determining the predicted pattern data is based on the action feedback data.

20. The system of claim 15, further comprising:
determining next action prediction data representing a next action prediction, wherein traversing the graph data is based on the next action prediction data.

21. The system of claim 20, further comprising:
determining action feedback data representing a pattern of usage by a plurality of users of the at least one application, wherein determining the next action prediction data is based on the action feedback data.

22. The system of claim 15, further comprising:
storing traversal history data representing a history of traversals of the graph data, wherein traversing the graph data comprises determining a next traversal path based on the traversal history data, wherein the next traversal path is not stored in the traversal history data.

23. The system of claim 15, further comprising:
determining validation expectation data representing a predicted validation expectation, wherein matching the test case data to the project is based on the validation expectation data.

24. The system of claim 23, further comprising:
determining action feedback data representing a pattern of usage by a plurality of users of the at least one application, wherein determining the validation expectation data is based on the action feedback data.

25. The system of claim 15, further comprising:
performing a project test execution of the test case data through an endpoint of the project to determine a project test result of the project test execution.

26. The system of claim 25, further comprising:
storing virtual user profile data representing a plurality of profiles of virtual users;
receiving, from a tester, selection data representing a selection from the virtual user profile data;
storing active pool data based on the selection data;
managing test administration data representing test administration credentials associated with the virtual user profile data;
launching a traversal of the graph data based on the active pool data and enabling authentication through the endpoint based on the test administration data; and
receiving, from the tester, input data representing an instruction to begin testing and displaying, to the tester, output data representing a test result of the testing.

27. A system for state based intelligent test generation for use with a data management service, comprising:
- a state model module configured to determine state model data representing an abstraction of states of at least one application;
- an action configuration module configured to determine action configuration data representing an abstraction of actions of the at least one application;
- a state generator module configured to generate graph data representing an abstraction of the at least one application, the graph data comprising nodes and edges of a finite state machine based on the state model data and based on the action configuration data, wherein the nodes of the finite state machine are limited by the state model data, wherein the edges of the finite state machine are limited by the action configuration data;
- a state traverser module configured to traverse the graph data and to generate test case data representing an abstracted action associated with a state of the at least one application; and
- a test execution adapter module configured to match the test case data to a project of the at least one application.

28. The system of claim 27, further comprising:
- a data generator module configured to generate production data representing a plurality of variables of the at least one application; and
- the state model module further configured to determine the state model data based on the production data.

29. The system of claim 27, wherein the project of the at least one application comprises a shared library of the at least one application.

30. The system of claim 27, further comprising:
- a machine learning engine module configured to determine predicted pattern data representing a predicted pattern of usage;
- a model traversal configuration module configured to store the predicted pattern data; and
- the state traverser module further configured to traverse the graph data based on the predicted pattern data.

31. The system of claim 30, further comprising:
- an action feedback module configured to determine action feedback data representing a pattern of usage by a plurality of users of the at least one application; and
- the machine learning engine module further configured to determine the predicted pattern data based on the action feedback data.

32. The system of claim 27, further comprising:
- a machine learning engine module configured to determine next action prediction data representing a next action prediction; and
- the state traverser module further configured to traverse the graph data based on the next action prediction data.

33. The system of claim 32, further comprising:
- an action feedback module configured to determine action feedback data representing a pattern of usage by a plurality of users of the at least one application; and
- the machine learning engine module further configured to determine the next action prediction data based on the action feedback data.

34. The system of claim 27, further comprising:
- a model traversal metric module configured to store traversal history data representing a history of traversals of the graph data; and
- the state traverser module further configured to determine a next traversal path based on the traversal history data, wherein the next traversal path is not stored in the traversal history data.

35. The system of claim 27, further comprising:
- a machine learning engine module configured to determine validation expectation data representing a predicted validation expectation; and
- the test execution adapter module further configured to match the test case data to the project based on the validation expectation data.

36. The system of claim 35, further comprising:
- an action feedback module configured to determine action feedback data representing a pattern of usage by a plurality of users of the at least one application; and
- the machine learning engine module further configured to determine the validation expectation data based on the action feedback data.

37. The system of claim 27, further comprising:
- a project endpoint module configured to perform a project test execution of the test case data through an endpoint of the project and to determine a project test result of the project test execution.

38. The system of claim 37, further comprising:
- a virtual user profile database configured to store virtual user profile data representing a plurality of profiles of virtual users;
- a test lab interface module configured to receive, from a tester, selection data representing a selection from the virtual user profile data;
- an active pool module configured to store active pool data based on the selection data;
- a test data manager module configured to manage test administration data representing test administration credentials associated with the virtual user profile data;
- a virtual pool instance manager module configured to interact with the state traverser module to launch a traversal of the graph data based on the active pool data and to interact with the test execution adapter module to enable authentication through the endpoint based on the test administration data; and
- a virtual test pool dashboard module configured to receive, from the tester, input data representing an instruction to begin testing and to display, to the tester, output data representing a test result of the testing.

39. A method for state based intelligent test generation for use with a data management service, comprising:
- storing virtual user profile data representing a plurality of profiles of virtual users;
- receiving, from a tester, selection data representing a selection from the virtual user profile data;
- generating active pool data based on the selection data;
- launching a traversal of graph data based on the active pool data to generate test case data representing an abstracted action associated with a state of at least one application, the graph data comprising nodes and edges of a finite state machine, wherein the nodes of the finite state machine are limited by state model data representing an abstraction of states of the at least one application, wherein the edges of the finite state machine are limited by action configuration data representing an abstraction of actions of the at least one application;
- matching the test case data to a project of the at least one application; and
- performing a project test execution of the test case data through an endpoint of the project to determine a project test result of the project test execution.

40. The method of claim 39, wherein the project of the at least one application comprises a shared library of the at least one application.

41. The method of claim 39, further comprising:
determining predicted pattern data representing a predicted pattern of usage; and
storing the predicted pattern data, wherein the traversal of the graph data is based on the predicted pattern data.
42. The method of claim 39, further comprising:
determining next action prediction data representing a next action prediction, wherein the traversal of the graph data is based on the next action prediction data.
43. The method of claim 39, further comprising:
storing traversal history data representing a history of the traversal of the graph data and determining a next traversal path based on the traversal history data, wherein the next traversal path is not stored in the traversal history data.
44. The method of claim 39, further comprising:
determining validation expectation data representing a predicted validation expectation, wherein matching the test case data to the project is based on the validation expectation data.
45. The method of claim 39, further comprising:
managing test administration data representing test administration credentials associated with the virtual user profile data; and
receiving, from the tester, input data representing an instruction to begin testing and displaying, to the tester, output data representing a test result of the testing.
46. A system for state based intelligent test generation for use with a data management service, comprising:
at least one processor; and
at least one memory coupled to the at least one processor, the at least one memory having stored therein instructions which when executed by any set of the at least one processor, perform a process for use with the transaction management service, the process including:
storing virtual user profile data representing a plurality of profiles of virtual users;
receiving, from a tester, selection data representing a selection from the virtual user profile data;
generating active pool data based on the selection data;
launching a traversal of graph data based on the active pool data to generate test case data representing an abstracted action associated with a state of at least one application, the graph data comprising nodes and edges of a finite state machine, wherein the nodes of the finite state machine are limited by state model data representing an abstraction of states of the at least one application, wherein the edges of the finite state machine are limited by action configuration data representing an abstraction of actions of the at least one application;
matching the test case data to a project of the at least one application; and
performing a project test execution of the test case data through an endpoint of the project to determine a project test result of the project test execution.
47. The system of claim 46, wherein the project of the at least one application comprises a shared library of the at least one application.
48. The system of claim 46, further comprising:
determining predicted pattern data representing a predicted pattern of usage; and
storing the predicted pattern data, wherein the traversal of the graph data is based on the predicted pattern data.
49. The system of claim 46, further comprising:
determining next action prediction data representing a next action prediction, wherein the traversal of the graph data is based on the next action prediction data.
50. The system of claim 46, further comprising:
storing traversal history data representing a history of the traversal of the graph data and determining a next traversal path based on the traversal history data, wherein the next traversal path is not stored in the traversal history data.
51. The system of claim 46, further comprising:
determining validation expectation data representing a predicted validation expectation, wherein matching the test case data to the project is based on the validation expectation data.
52. The system of claim 46, further comprising:
managing test administration data representing test administration credentials associated with the virtual user profile data; and
receiving, from the tester, input data representing an instruction to begin testing and displaying, to the tester, output data representing a test result of the testing.
53. A system for state based intelligent test generation for use with a data management service, comprising:
a virtual user profile database configured to store virtual user profile data representing a plurality of profiles of virtual users;
a test lab interface module configured to receive, from a tester, selection data representing a selection from the virtual user profile data;
an active pool module configured to generate active pool data based on the selection data;
a virtual pool instance manager module configured to interact with a state traverser module to launch a traversal of graph data to generate test case data representing an abstracted action associated with a state of at least one application, the graph data comprising nodes and edges of a finite state machine, wherein the nodes of the finite state machine are limited by state model data representing an abstraction of states of the at least one application, wherein the edges of the finite state machine are limited by action configuration data representing an abstraction of actions of the at least one application;
a test execution adapter module configured to match the test case data to a project of the at least one application; and
a project endpoint module configured to perform a project test execution of the test case data through an endpoint of the project and to determine a project test result of the project test execution.
54. The system of claim 53, wherein the project of the at least one application comprises a shared library of the at least one application.
55. The system of claim 53, further comprising:
a machine learning engine module configured to determine predicted pattern data representing a predicted pattern of usage;
a model traversal configuration module configured to store the predicted pattern data; and
the state traverser module configured to traverse the graph data based on the predicted pattern data.
56. The system of claim 53, further comprising:
a machine learning engine module configured to determine next action prediction data representing a next action prediction; and the state traverser module configured to traverse the graph data based on the next action prediction data.

57. The system of claim 53, further comprising:

a model traversal metric module configured to store traversal history data representing a history of the traversal of the graph data; and the state traverser module configured to determine a next traversal path based on the traversal history data, wherein the next traversal path is not stored in the traversal history data.

58. The system of claim 53, further comprising:

a machine learning engine module configured to determine validation expectation data representing a predicted validation expectation; and the test execution adapter module further configured to match the test case data to the project based on the validation expectation data.

59. The system of claim 53, further comprising:

a test data manager module configured to manage test administration data representing test administration credentials associated with the virtual user profile data; and a virtual test pool dashboard module configured to receive, from the tester, input data representing an instruction to begin testing and to display, to the tester, output data representing a test result of the testing.

\* \* \* \* \*